(12) United States Patent
Kobayashi et al.

(10) Patent No.: US 10,399,613 B2
(45) Date of Patent: Sep. 3, 2019

(54) VEHICLE FRONT STRUCTURE

(71) Applicant: SUBARU CORPORATION, Tokyo (JP)

(72) Inventors: Ryuya Kobayashi, Tokyo (JP); Yusuke Oki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 24 days.

(21) Appl. No.: 15/886,678

(22) Filed: Feb. 1, 2018

(65) Prior Publication Data
US 2018/0257719 A1 Sep. 13, 2018

(30) Foreign Application Priority Data

Mar. 10, 2017 (JP) ................. 2017-045984

(51) Int. Cl.
B62D 35/02 (2006.01)
B62D 35/00 (2006.01)
(Continued)

(52) U.S. Cl.
CPC ......... B62D 35/005 (2013.01); B62D 25/081 (2013.01); B62D 35/001 (2013.01);
(Continued)

(58) Field of Classification Search
CPC .. B62D 35/005; B62D 25/081; B62D 35/008; B62D 35/02; B62D 35/001; B62D 35/007; B60S 1/52; B60S 1/0463; B63B 1/00
(Continued)

(56) References Cited

U.S. PATENT DOCUMENTS 7,014,131 B2 * 3/2006 Berning .................... B05B 1/08
239/589.1
2007/0018013 A1 * 1/2007 Lasebnick ............... B05B 1/042
239/284.1
(Continued)

FOREIGN PATENT DOCUMENTS

JP S62-117112 U 7/1987
JP H8-142914 A 6/1996
(Continued)

OTHER PUBLICATIONS

Office Action dated Jul. 17, 2018 during the prosecution of Japanese Patent Application No. JP2017-045984 (with English Translation).

Primary Examiner — Pinel E Romain
(74) Attorney, Agent, or Firm — Troutman Sanders LLP

(57) ABSTRACT

A vehicle front structure includes a front window glass, a washer nozzle, a cowl, and plate members. The front window glass includes angle-of-view areas at its upper portions. The angle-of-view areas cover angles of view of left and right imagers disposed on an interior of a vehicle. The washer nozzle ejects a washer fluid to an outer surface of the front window glass. The cowl is recessed and extends in a vehicle width direction between the front window glass and a front hood. The plate members stand erect in the cowl and extend in a vehicle front-rear direction. The plate members are disposed at least one at each outer side, in the vehicle width direction, of a widthwise center of the vehicle. The plate members extend toward an area interposed between outer edges of the angle-of-view areas in the vehicle width direction in a plan view of the vehicle.

6 Claims, 5 Drawing Sheets

(51) Int. Cl.
*B62D 25/08* (2006.01)
*B63B 1/00* (2006.01)
*B60S 1/04* (2006.01)
*B60S 1/52* (2006.01)

(52) U.S. Cl.
CPC ......... *B62D 35/007* (2013.01); *B62D 35/008*
(2013.01); *B62D 35/02* (2013.01); *B60S
1/0463* (2013.01); *B60S 1/52* (2013.01); *B63B
1/00* (2013.01)

(58) Field of Classification Search
USPC ........................................................ 296/181.5
See application file for complete search history.

(56) References Cited

U.S. PATENT DOCUMENTS

| | | | |
|---|---|---|---|
| 2011/0292212 A1* | 12/2011 | Tanabe | B05B 1/08 348/148 |
| 2012/0280060 A1* | 11/2012 | Renke | B60S 1/486 239/284.1 |
| 2013/0255024 A1 | 10/2013 | Kaminaga et al. | |
| 2015/0183404 A1* | 7/2015 | Romack | B60S 1/485 134/34 |
| 2016/0207503 A1* | 7/2016 | Sugai | B60S 1/52 |

FOREIGN PATENT DOCUMENTS

| | | |
|---|---|---|
| JP | 2001-322562 A | 11/2001 |
| JP | 2005-289237 A | 10/2005 |
| JP | 2013-208993 A | 3/2012 |
| JP | 2013-208992 A | 10/2013 |

\* cited by examiner

VEHICLE FRONT STRUCTURE

CROSS-REFERENCE TO RELATED APPLICATIONS

The present application claims priority from Japanese Patent Application No. 2017-045984 filed on Mar. 10, 2017, the entire contents of which are hereby incorporated by reference.

BACKGROUND

1. Technical Field

The present invention relates to a vehicle front structure, and particularly, to a vehicle front structure including a pair of left and right imagers, disposed on the interior side of a front window glass, and a vehicle front window glass cleaner.

2. Related Art

In recent years, driver assistance systems including an imager, such as a camera, disposed on the interior side of a front window glass in a vehicle have been widely used to help drivers in driving by perceiving the circumstances in front of the vehicle using data imaged by the imager.

The imager is usually disposed in an upper middle area of the front window glass. When the front window glass has its upper middle area contaminated with, for example, dirt, the front window glass receives an ejection of a washer fluid and is wiped by a wiper device driven to remove the dirt. A general washer device, however, may fail to deliver the washer fluid to the upper middle area of the front window glass and fail to sufficiently wipe off the dirt due to the inaccessible washer fluid.

Japanese Unexamined Patent Application Publication (JP-A) No. 2013-208992 discloses a window washer device capable of effectively cleaning the upper middle area of the front window glass. Specifically, the window washer device of JP-A No. 2013-208992 includes, besides a normal washer nozzle, either one of a jet nozzle (example 1) that ejects a washer fluid to the upper middle area of the front window glass and a diffusing nozzle (example 2) attached to a wiper arm to eject a washer fluid from a portion adjacent to the upper middle area of the front window glass.

The above structure is capable of effectively cleaning the upper middle area of the front window glass, and smoothly prevents the adhering dirt from affecting the imaged data to avoid a problem on the use of the driver assistance system.

As illustrated in FIG. 5, an airstream entering a cowl 200, holding components of a vehicle wiper device such as wiper arms, during traveling of the vehicle, can cause turbulence (indicated by arrows 210) inside the cowl 200, which causes an unusual sound and increases air resistance. An example of an existing measure taken to address this problem is to provide a partitioning plate that partitions the space inside the cowl 200 in the front-rear direction.

The window washer device according to JP-A No. 2013-208992, however, requires the addition of a special component, such as either one of the addition of a separate jet nozzle and the addition of a diffusing nozzle to the wiper arm, to deliver the washer fluid to the upper middle area of the front window glass.

From an economical point of view, a device for delivering the washer fluid to the upper middle area of the front window glass without using a special component has been required.

SUMMARY OF THE INVENTION

It is desirable to provide a vehicle front structure that can deliver a washer fluid to an upper middle area of a front window glass without using a special component.

An aspect of the present invention is a vehicle front structure that includes a front window glass, a washer nozzle, a cowl, and plate members. The front window glass includes angle-of-view areas at its upper portions. The angle-of-view areas cover angles of view of a pair of left and right imagers disposed on the interior of a vehicle. The washer nozzle is configured to eject a washer fluid to an outer surface of the front window glass. The cowl is recessed and extends in a vehicle width direction between the front window glass and a front hood. The plate members stand erect in the cowl and extend in a vehicle front-rear direction. The plate members are disposed at least one at each outer side, in the vehicle width direction, of a widthwise center of the vehicle. The plate members extend toward an area interposed between outer edges of the angle-of-view areas in the vehicle width direction in a plan view of the vehicle.

DETAILED DESCRIPTION

Figure 1:
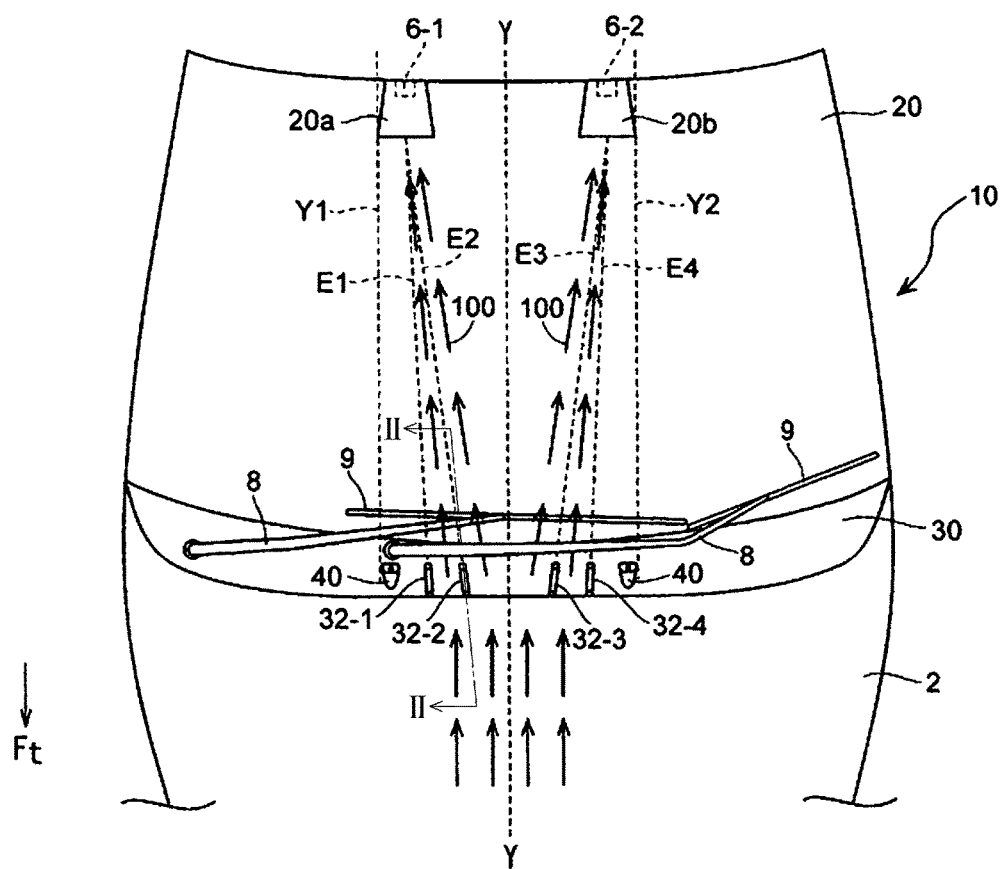
FIG. 1 is a plan view of a vehicle front structure according to an example of the present invention.
Figure 2:
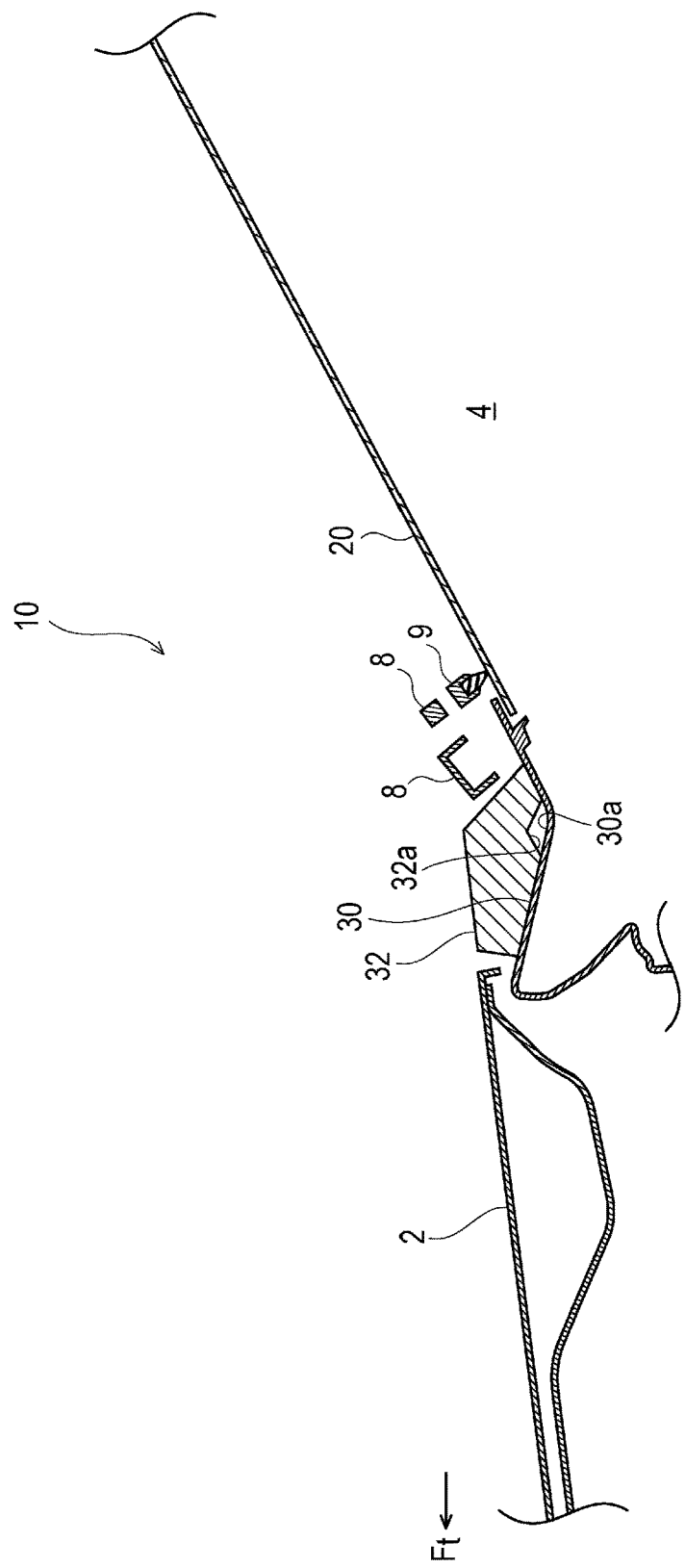
FIG. 2 is a sectional view of the vehicle front structure taken along line II-II of FIG. 1.
Figure 3:
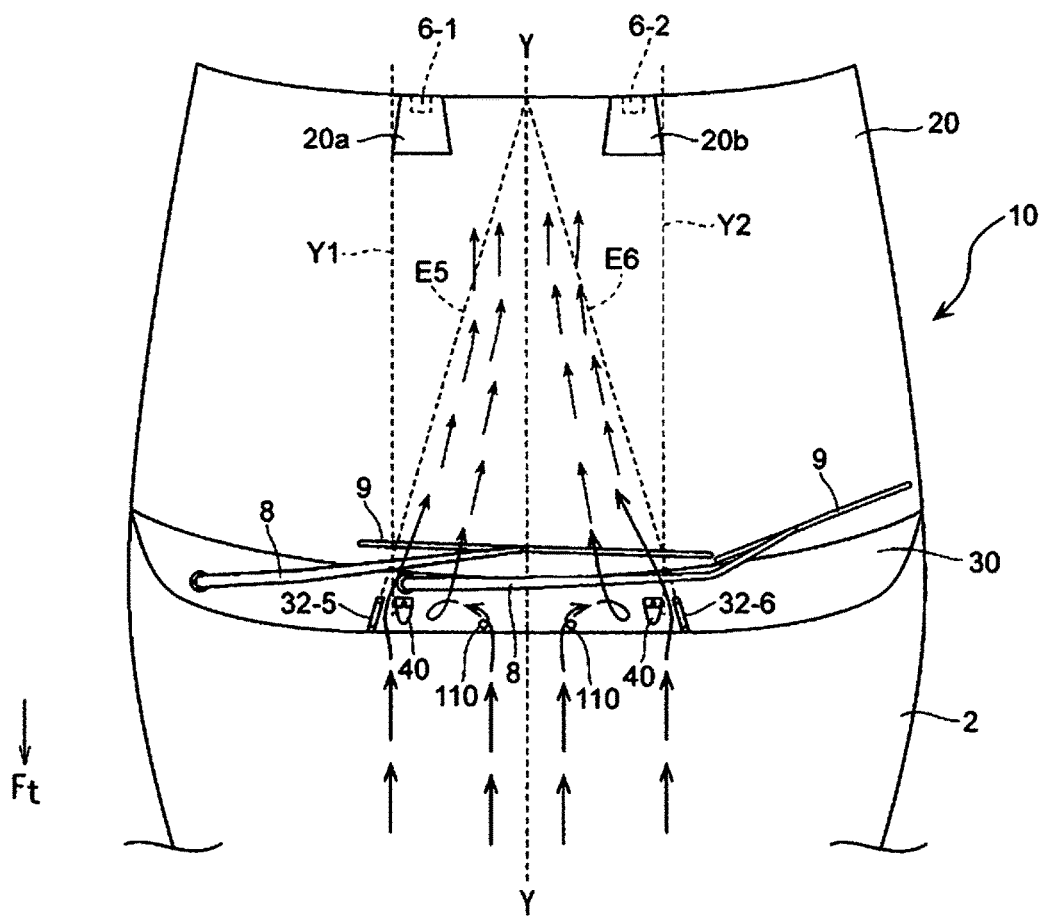
FIG. 3 is a plan view of a plate member according to another example.

Now, a vehicle front structure according to an example of the present invention is described in detail with reference to FIG. 1 to FIG. 3. FIG. 1 is a plan view of a vehicle front structure according to the present example, FIG. 2 is a sectional view of the vehicle front structure taken along line II-II of FIG. 1, and FIG. 3 is a plan view of a plate member according to another example. Throughout the drawings, Ft denotes the vehicle frontward direction, and line Y-Y denotes the center line of the vehicle in the vehicle width direction.

As illustrated in FIG. 1, a vehicle front structure 10 includes a front window glass 20, a cowl 30, interposed between the front window glass 20 and a front hood 2, and washer nozzles 40, which eject a washer fluid to the outer surface of the front window glass 20.

The front window glass 20 includes angle-of-view areas 20a and 20b, respectively covering the angles of view of a pair of left and right imagers 6-1 and 6-2 disposed in a vehicle cabin 4 (see FIG. 2), at its upper portions. In the present example, the imagers 6-1 and 6-2 are stereo cameras disposed on the left and right of the center line of the vehicle in the vehicle width direction (line Y-Y). In the present example, the angle-of-view areas 20a and 20b respectively cover the imagers 6-1 and 6-2 in a plan view of the vehicle.

The washer nozzles 40 may be disposed at any positions at which they can eject a washer fluid to the front window glass 20. For example, the washer nozzles 40 may be disposed at a position selected from the group consisting of the cowl 30, the front hood 2 (see FIG. 3), and wiper arms 8. Preferably, as in the present example illustrated in FIG. 1, the washer nozzles 40 are disposed at the cowl 30.

The cowl 30 stretches between front fenders, not illustrated, to serve as a recess extending in the vehicle width direction.

As illustrated in FIGS. 1 and 2, the cowl 30 includes plate members 32, which stand erect and extend in the vehicle front-rear direction. The plate members 32 are disposed at least one at each outer side, in the vehicle width direction, of the widthwise center of the vehicle, denoted with line Y-Y.

Figure 4:
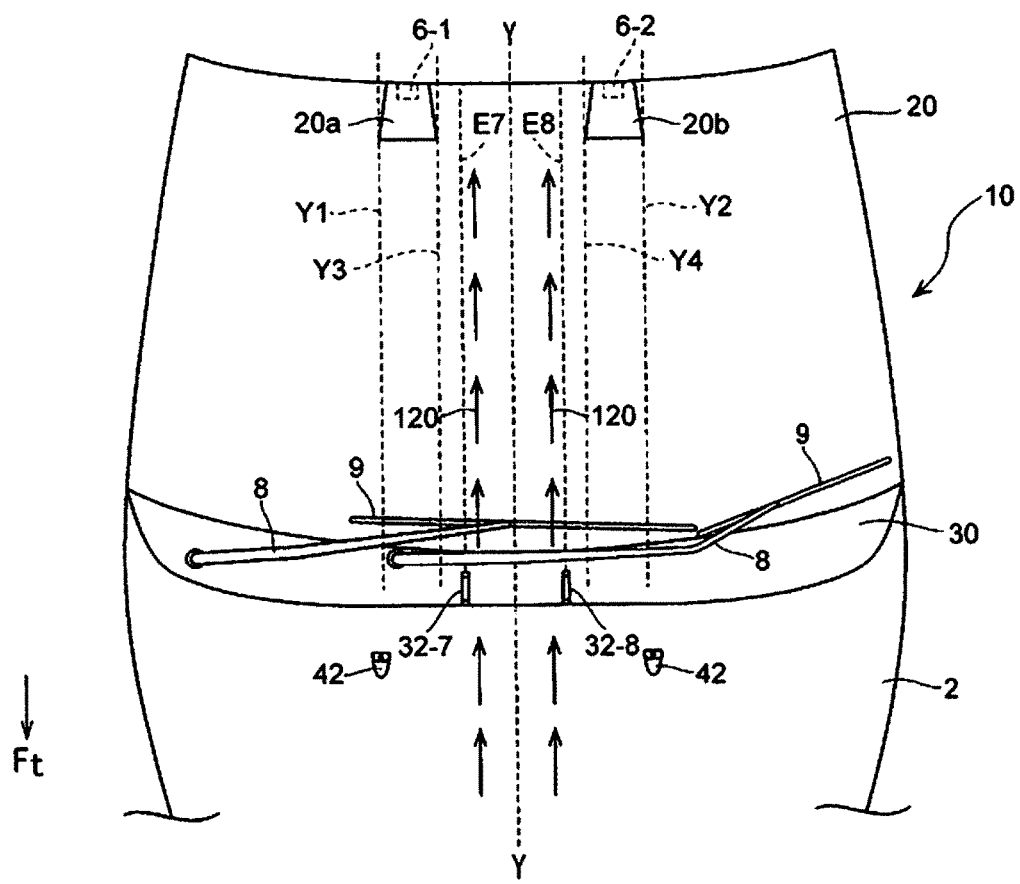
FIG. 4 is a plan view of plate members and washer nozzles according to a modification example.
Figure 5:
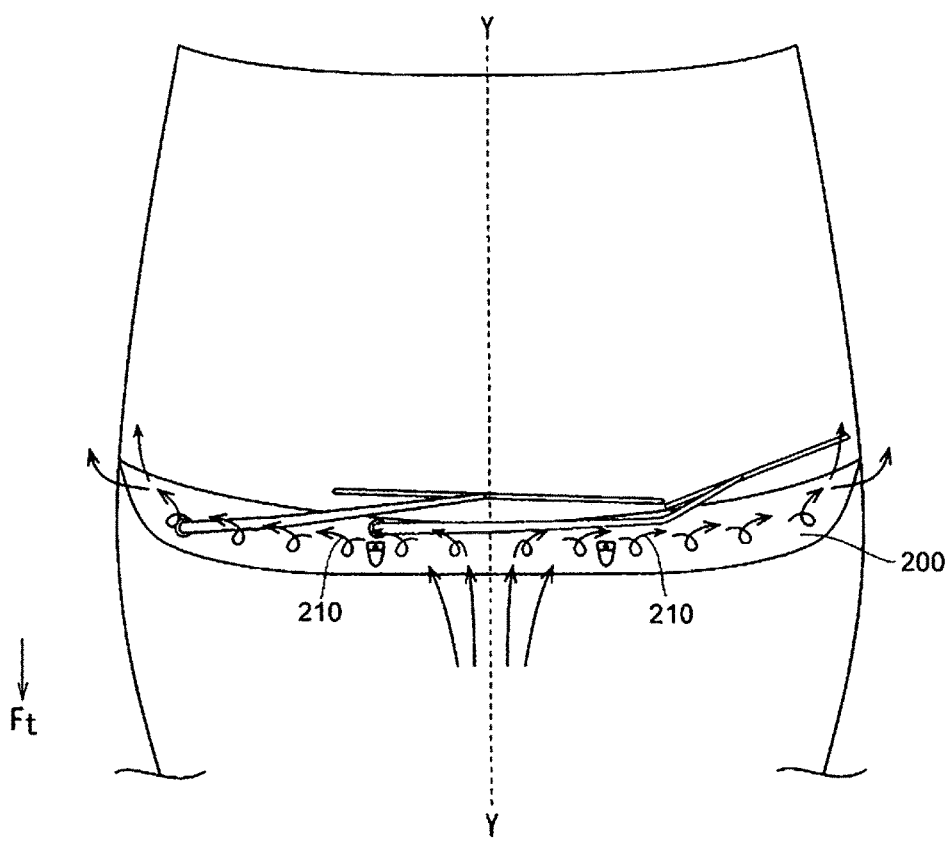
FIG. 5 is a plan view of an existing vehicle front structure.

In the present example, the plate members 32 are disposed two at each outer side, in the vehicle width direction, of the widthwise center of the vehicle, that is, four in total. The number of the plate members 32 disposed in the cowl 30 may be one at each outer side, in the vehicle width direction, of the widthwise center of the vehicle (two in total), as illustrated in FIG. 3 and FIG. 4. The number of the plate members 32 disposed at each outer side, in the vehicle width direction, of the widthwise center of the vehicle is at least one, preferably, one (two in total) to three (six in total), and particularly preferably, two (four in total).

When the vehicle is viewed in a plan, the plate members 32 extend toward the area interposed between broken lines Y1 and Y2, respectively denoting the outer edges of the angle-of-view areas 20a and 20b in the vehicle width directions. Preferably, the plate members 32 extend toward the areas 20a and 20b.

In the present example, as illustrated with broken lines in FIG. 1, broken lines E1 and E2, respectively denoting the directions in which the plate members 32-1 and 32-2 extend, extend toward the angle-of-view area 20a in the area interposed between the outer edges of the areas 20a and 20b in the vehicle width direction. Broken lines E3 and E4, respectively denoting the directions in which the plate members 32-3 and 32-4 extend, extend toward the angle-of-view area 20b in the area interposed between the outer edges of the areas 20a and 20b in the vehicle width direction.

Preferably, the plate members 32 are entirely disposed on the inner sides of the outer edges of the angle-of-view areas 20a and 20b for the imagers in the vehicle width direction, in a plan view of the vehicle.

In the present example, the plate members 32 are entirely disposed on the inner sides of straight lines Y1 and Y2 in the vehicle widthwise direction in a plan view of the vehicle. Straight lines Y1 and Y2 denote the outer edges, in the vehicle width direction, of the angle-of-view areas 20a and 20b for the imagers 6-1 and 6-2.

The plate members 32 that stand erect in the cowl 30 partition the recessed cowl 30 to prevent the airstream that flows into the cowl 30 from the front hood 2 from flowing in the vehicle width direction in the form of turbulence inside the cowl 30, and reorient the airstream toward the front window glass 20. If the plate members 32 can effectively reorient the airstream that flows into the cowl 30, the plate members 32 do have to thoroughly partition the cowl 30.

For example, as illustrated in FIG. 2, an area of the cowl 30 holding the wiper arms 8 and blades 9 is not partitioned by the plate members 32. Each plate member 32 may have a groove 32a at a bottom portion 30a of the cowl 30.

The groove 32a allows rainwater and the like accumulated at the bottom portion 30a of the cowl 30 to move outward in the vehicle width direction.

In the vehicle front structure 10 according to the present example, the plate members 32-1 to 32-4 stand erect in the cowl 30, broken lines E1 and E2, respectively denoting the directions in which the plate members 32-1 and 32-2 extend, extend toward the angle-of-view area 20a, and broken lines E3 and E4, respectively denoting the directions in which the plate members 32-3 and 32-4 extend, extend toward the angle-of-view area 20b. Thus, the airstream that flows into the cowl 30 from the front hood 2 can be reoriented to be shot to the front window glass 20, particularly, toward the angle-of-view areas 20a and 20b of the imagers 6-1 and 6-2, as indicated with arrows 100.

Thus, the washer fluid ejected from the washer nozzles 40 to the front window glass 20 can be delivered to the areas 20a and 20b on the airstream with pinpoint accuracy.

The washer fluid can be delivered to the angle-of-view areas 20a and 20b of the respective imagers 6-1 and 6-2 by changing the arrangement of the plate members in the cowl from an existing one. This structure thus does not include a special component.

All the plate members 32-1 to 32-4 are entirely disposed on the inner sides of the outer edges of the angle-of-view areas 20a and 20b for the imagers 6-1 and 6-2 in the vehicle width direction. Thus, the airstream that flows into the cowl 30 mainly from the middle area of the front hood 2 in the vehicle width direction and that flows outward in the vehicle width direction can be blocked at portions on the inner sides of the outer edges of the angle-of-view areas 20a and 20b for the imagers 6-1 and 6-2 in the vehicle width direction, and thus can be reoriented toward the front window glass 20.

This structure can thus further effectively deliver the washer fluid to the area interposed between the outer edges of the angle-of-view areas 20a and 20b for the imagers 6-1 and 6-2 in the vehicle width direction.

Moreover, the washer nozzles 40 are disposed at the portions in the cowl 30 from which the airstream that has flowed into the recessed cowl 30 and then reoriented by the plate members 32-1 to 32-4 flows out toward the front window glass 20. Thus, the ejected washer fluid is easily carried on the airstream that flows out toward the front window glass 20.

This structure can thus rapidly shoot the washer fluid to an upper portion of the front window glass 20 to more effectively deliver the washer fluid to the angle-of-view areas 20a and 20b for the respective imagers 6-1 and 6-2.

In the example, the plate members 32 are entirely disposed on the inner sides of the outer edges of the angle-of-view areas 20a and 20b for the imagers 6-1 and 6-2 in the vehicle width direction, in a plan view of the vehicle (that is, at portions on the inner sides of straight lines Y1 and Y2 of FIG. 1 in the vehicle width direction). However, this is not the only possible structure.

FIG. 3 illustrates plate members 32 according to another example. In this drawing, components the same as those of the example illustrated in FIG. 1 and FIG. 2 are denoted with the same reference symbols and not described.

As illustrated in FIG. 3, in this example, in a plan view of the vehicle, a plate member 32-5 is entirely located on the outer side of straight line Y1 in the vehicle width direction, and a plate member 32-6 is entirely located on the outer side of straight line Y2 in the vehicle width direction.

The plate members 32-5 and 32-6 are disposed in the cowl 30 at such positions and directions as to form an inverted V shape, in a plan view of the vehicle, to gradually extend inward in the vehicle width direction from the front end toward the vehicle rear. Extension lines E5 and E6, respectively denoting the directions in which the plate members 32-5 and 32-6 extend, extend toward the center line Y-Y of the vehicle in the vehicle width direction, in the area interposed between the inner edges of the angle-of-view areas 20a and 20b in the vehicle width direction.

In this example, as indicated with arrows 110 in FIG. 3, the plate members 32-5 and 32-6 stand erect in the cowl 30 at portions from which the airstream that has flowed into the cowl 30 from the front hood 2 starts flowing outward in the vehicle width direction while whirling. The extension lines E5 and E6, respectively denoting the directions in which the plate members 32-5 and 32-6 extend, extend toward the center line Y-Y of the vehicle in the vehicle width direction, in the area interposed between the inner edges of the angle-of-view areas 20a and 20b in the vehicle width direction. This structure can thus shoot the airstream that has flowed into the cowl 30 from the front hood 2 to the area interposed between the inner edges of the angle-of-view areas 20a and 20b for the pair of left and right imagers 6-1 and 6-2 in the vehicle width direction.

This structure can thus evenly deliver the washer fluid on the airstream to the angle-of-view areas 20a and 20b for the left and right imagers 6-1 and 6-2.

The plate members 32 may be entirely disposed on the inner sides of the angle-of-view areas 20a and 20b for the imagers 6-1 and 6-2 in the vehicle width direction. Alternatively, the washer nozzles may be disposed at positions other than in the cowl 30.

FIG. 4 is a plan view of plate members and washer nozzles according to a modification example. In this drawing, the components the same as those in the example illustrated in FIG. 1 to FIG. 3 are denoted with the same reference signs and not described.

As illustrated, in a plan view of the vehicle, plate members 32-7 and 32-8 are entirely disposed on the outer sides of the vehicle center in the vehicle width direction, and one on each of the inner sides of lines Y3 and Y4, respectively denoting the inner edges of the angle-of-view areas 20a and 20b of the imagers 6-1 and 6-2.

When the vehicle is viewed in a plan, the plate members 32-7 and 32-8 are disposed substantially parallel to line Y-Y. Thus, broken lines E7 and E8, respectively denoting the directions in which the plate members 32-7 and 32-8 extend, also extend substantially parallel to line Y-Y, and extend toward the area interposed between the inner edges of the angle-of-view areas 20a and 20b in the vehicle width direction.

As illustrated in FIG. 4, when the imagers 6-1 and 6-2 are respectively covered with the angle-of-view areas 20a and 20b in a plan view of the vehicle, the plate members 32-7 and 32-8 only have to be disposed on the inner sides of the imagers 6-1 and 6-2 in the vehicle width direction and to extend toward the area on the inner sides of the imagers 6-1 and 6-2 in the vehicle width direction.

In the present modification example, washer nozzles 42 are disposed on the front hood 2, one on each of the right and left sides symmetrically with respect to line Y-Y.

In the present modification example, the plate members 32-7 and 32-8 are disposed one on each of the inner sides of lines Y3 and Y4, respectively denoting the inner edges of the angle-of-view areas 20a and 20b. Broken lines E7 and E8, respectively denoting the directions in which the plate members 32-7 and 32-8 extend, extend toward the area interposed between the inner edges of the angle-of-view areas 20a and 20b in the vehicle width direction. Thus, the airstream that flows into the cowl 30 mainly from the middle area of the front hood 2 in the vehicle width direction can be directly reoriented, as indicated with arrows 120, toward the front window glass 20, particularly toward the area on the inner sides of the inner edges of the angle-of-view areas 20a and 20b for the imagers 6-1 and 6-2 before the airstream flows in the vehicle width direction.

Thus, the washer fluid can be evenly delivered on the airstream to the angle-of-view areas 20a and 20b.

In an aspect of the present invention, plate members stand erect in a cowl. The plate members extend toward an area interposed between the outer edges of the angle-of-view areas for the pair of left and right imagers in the vehicle width direction. This structure can reorient the airstream that has flowed into the cowl from a front hood, and shoot the airstream to the front window glass, particularly, to the area interposed between the outer edges of the angle-of-view areas for the imagers in the vehicle width direction.

The washer fluid ejected from the washer nozzles to the front window glass can thus be delivered to the area on the airstream. Thus, dirt that adheres to the area can be effectively removed from the area, and is prevented from affecting the data imaged by the imagers.

Concurrently, the washer fluid can be delivered to the area interposed between the outer edges of the angle-of-view areas for the imagers in the vehicle width direction by changing the arrangement of the plate members in a cowl from an existing one. This structure can enhance the productivity without the addition of another component and an assembly of the component.

The invention claimed is:

1. A vehicle front structure, comprising:
a front window glass that comprises angle-of-view areas at upper portions of the front window glass, the angle-of-view areas covering angles of view of a pair of left and right imagers disposed on an interior of a vehicle;
a washer nozzle configured to eject a washer fluid to an outer surface of the front window glass;
a cowl that is recessed and extends in a vehicle width direction between the front window glass and a front hood; and
plate members that stand erect in the cowl, extend in a vehicle front-rear direction, and are non-tilted in a vertical direction of the vehicle,
wherein the plate members are disposed at least one at each outer side, in the vehicle width direction, of a widthwise center of the vehicle, and
wherein the plate members extend toward an area interposed between outer edges of the angle-of-view areas in the vehicle width direction in a plan view of the vehicle.

2. The vehicle front structure according to claim 1, wherein the plate members extend toward an area interposed between inner edges of the angle-of-view areas in the vehicle width direction in a plan view of the vehicle.

3. The vehicle front structure according to claim 1, wherein the plate members are entirely disposed on inner sides of outer edges of the angle-of-view areas of the imagers in the vehicle width direction in a plan view of the vehicle.

4. The vehicle front structure according to claim 1, wherein the washer nozzle is disposed at the cowl.

5. The vehicle front structure according to claim 2, wherein the washer nozzle is disposed at the cowl.

6. The vehicle front structure according to claim 3, wherein the washer nozzle is disposed at the cowl.

* * * * *